United States Patent [19]

Immel

[11] Patent Number: 4,811,988
[45] Date of Patent: Mar. 14, 1989

[54] POWERED LOAD CARRIER

[76] Inventor: Erich Immel, 6525 Fairmount Ave., El Cerrito, Calif. 94530

[21] Appl. No.: 23,538

[22] Filed: Mar. 9, 1987

[51] Int. Cl.⁴ .............................................. B62B 3/08
[52] U.S. Cl. ..................................... 298/2; 180/19.1; 298/12
[58] Field of Search ...................... 298/1 A, 1 C, 2, 3, 298/12, 14; 180/19.1

[56] References Cited

U.S. PATENT DOCUMENTS

| | | | |
|---|---|---|---|
| 1,985,169 | 12/1934 | Howell et al. | 298/12 X |
| 2,477,066 | 7/1949 | Kuert et al. | 298/12 |
| 2,918,133 | 12/1959 | Ericsson | 298/2 X |
| 3,281,186 | 10/1966 | Davis | 298/2 |
| 3,323,837 | 6/1967 | Landry | 298/2 |
| 3,471,045 | 10/1969 | Panciocco | 298/1 A X |
| 4,289,212 | 9/1981 | Immel | 180/19.1 |
| 4,589,508 | 5/1986 | Hoover et al. | 180/19.1 |
| 4,627,782 | 12/1986 | Larson | 298/12 X |

FOREIGN PATENT DOCUMENTS

| | | | |
|---|---|---|---|
| 22720 | 1/1981 | European Pat. Off. | 298/12 |
| 475161 | 11/1937 | United Kingdom | 298/2 |

Primary Examiner—Leslie J. Paperner
Attorney, Agent, or Firm—Bruce & McCoy

[57] ABSTRACT

A powered load carrier having a front wheel and rear driving wheels secured to a lower frame which supports a hinged upper frame that engage a detachable load carrying apparatus which is slideable on the upper frame between a rearward position where the load is disposed over the drive wheels and a forward position over the hinge whereby the upper frame can be tipped forward at its hinge to dump the load.

1 Claim, 4 Drawing Sheets

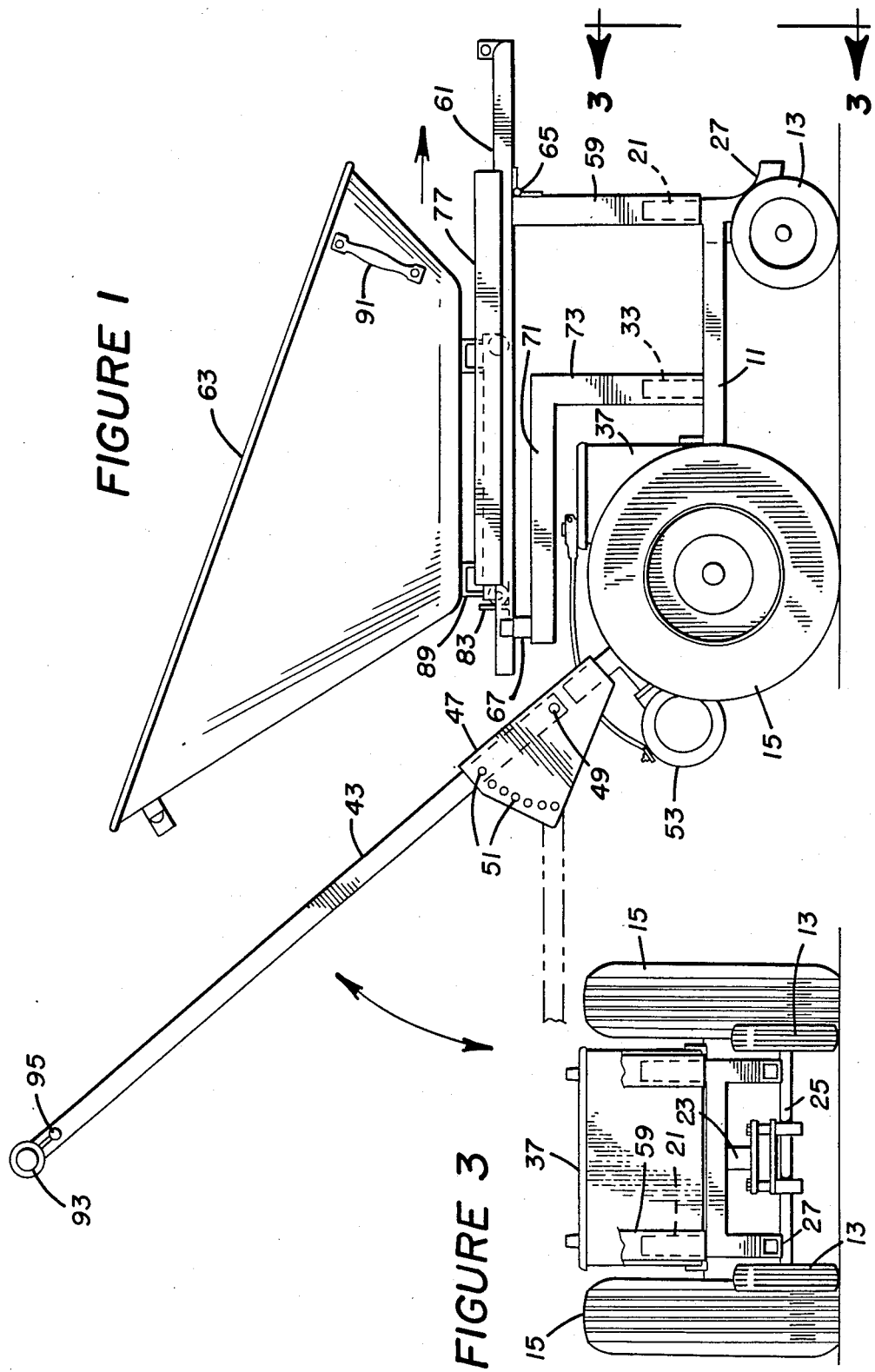

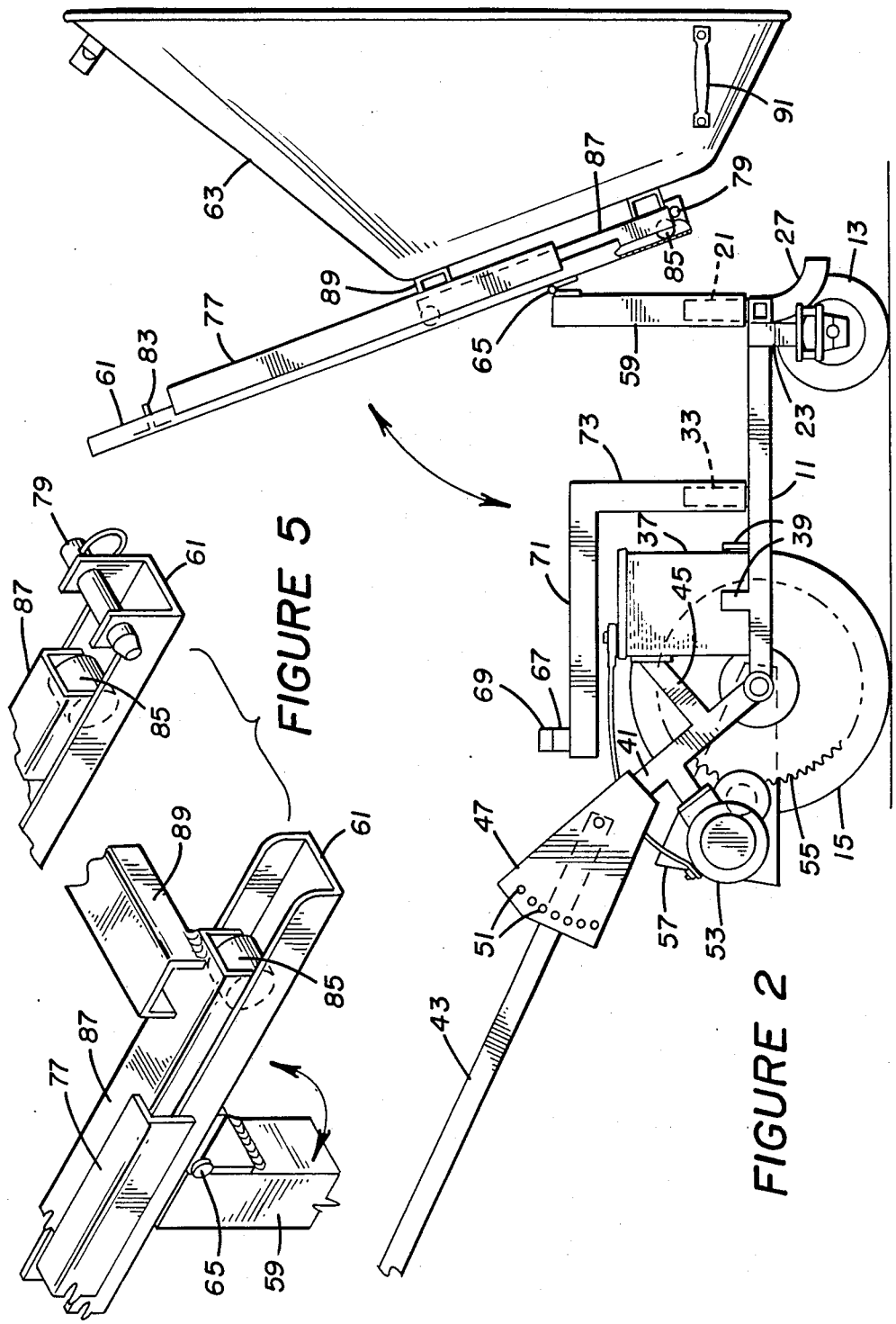

POWERED LOAD CARRIER

BACKGROUND OF THE INVENTION

1. Field of the Invention

The present invention relates to load carriers and more particularly to a powered load carrier such as a wheelbarrow which is operable by an individual but is powered to permit a larger capacity to be carried and to move loads uphill.

2. Description of the Prior Art

The present invention is a modification and improvement of the device disclosed and claimed in U.S. Pat. No. 4,289,212 for a SELF PROPELLED BATTERY POWERED CART FOR PUSHING DISABLED VEHICLES issued Sept. 15, 1981, to Eric A. Immel, the inventor of the present invention, and now sold under the registered U.S. trademark "PushMobile". The device of that invention has been modified slightly as will be evident from the enclosed drawings for permitting the machine to carry materials on top of it either on a flatbed or in a bucket as well as to push-movable objects.

The closest prior art invention known to the inventor is U.S. Pat. No. 4,589,508 for a MOTORIZED WHEELBARROW issued May 20, 1986, to William A. Hoover and Fred E. Payne. That device is similar in construction to a standard wheelbarrow with a motor located underneath it which drives a single front wheel. However, the bucket of that wheelbarrow is supported in a frame which is capable of being pivoted upward and forward over the front wheel in order to empty the bed without having to lift the engine and power drive train. The problem with the device of the '508' patent is that the center of gravity of both the load and the engine are behind the front wheel and forward of the lifting handles whereby in order to move the load the operator must lift not only the load but also the engine and transmission which drive the wheelbarrow.

Not only is the motorized wheelbarrow of the '508' patent impractical because of the additional proportional weight of the engine and transmission that must be lifted when transporting a load, but the dumping of the wheelbarrow is made even more difficult than in a standard wheelbarrow. With a standard wheelbarrow, the operator lifts up on the handles which gives leverage to dump the load. But in the '508' motorized wheelbarrow, the bucket must be dumped forward over the front wheel while the motor and handles remain horizontal.

Thus, the design appears to be an entirely impractical concept as it disregards the two particular advantageous features of a traditional wheelbarrow. The reduction in weight of a particular load that needs to be lifted by the operator of a standard wheelbarrow is achieved through the leverage provided by the elongated handles and centering the load close to the wheel. This advantage is off set in the '508' patent by adding the heavy motor and transmission to the load to be lifted. Worse yet, however, is the fact that the load has to be dumped without the leverage provided by standard wheelbarrow handles since the bucket must be dumped separately without the aid of the handles which stay flat with the motor and transmission. Even more disadvantageous is the fact that the operator cannot position himself close to the bucket for the purpose of lifting it and the load but must straddle the handles and motor, or stand between them and lean over the motor, in order to obtain the best lifting advantage at the rear of the bucket. This seems to be a totally impractical design for these several reasons.

The present invention has none of the disadvantages of the '508' patent and solves all of the problems that needed to be overcome to provide a motorized load carrier. In the process of solving these problems, several important additional advantages are achieved.

SUMMARY OF THE INVENTION

The present invention is a powered load carrier comprising a lower frame which has at least one wheel mounted proximate the front end thereof and a pair of drive wheels mounted proximate the rear end thereof. A control bar is secured to and extends rearward and upward from the rear end of the lower frame. A drive motor is mounted on the control bar and includes a drive means for engaging the motor with the drive wheels. A removable upper frame is engaged with the lower frame and includes a pair of horizontal tracks for supporting a detachable load carrying apparatus. The upper frame is hinged with respect to the lower frame at its forward end whereby the load carrying apparatus can be tipped forward with respect to the lower frame in order to dump the load. The load carrying apparatus can be moved forward or backward on the tracks between a position at the forward end of the tracks for dumping and at the rear end of the tracks whereby the load is positioned substantially over the drive wheels.

OBJECTS OF THE INVENTION

It is therefore an important object of the present invention to provide a powered load carrier which can utilize several types of interchangable load carrying apparatus such as a flatbed or a bucket.

It is another object of the present invention to provide a powered load carrier in which the load carrying apparatus is detachable from the frame so that the device can be used as a powered pusher for movable objects.

It is a further object of the present invention to provide a powered load carrier in which the load carrying apparatus can be moved on the frame from a stabilized position for transporting the load to a position where the load can be dumped without lifting the load.

It is yet another object of the present invention to provide a powered load carrier in which the weight of the load can be centered close to or over the drive wheels to lessen the load the operator has to support or stabilize and to provide additional traction to the drive wheels.

It is still a further object of the present invention to provide a load carrying apparatus which can be unloaded without lifting the load but by simply sliding it on rollers until it dumps itself.

Other objects of the present invention will become apparent when the description of the drawings set forth herein is considered in conjunction with the accompanying drawings.

BRIEF DESCRIPTION OF THE DRAWINGS

FIG. 1 is a side elevation of the powered load carrier of the present invention with a load carrying apparatus disposed at its rearwardmost position centering the load close to the drive wheels;

FIG. 2 is a partial side elevation in partial section of the powered load carrier of the present invention showing the load carrying apparatus at its forward tipped position for dumping the load;

FIG. 3 is a partial front elevation taken along lines 3—3 of FIG. 1;

FIG. 5 is a partial perspective view showing the load support apparatus of the detachable load carrying bucket disposed in the horizontal tracks of the upper frame of the present invention;

DESCRIPTION OF THE PREFERRED EMBODIMENT

Figure 4:
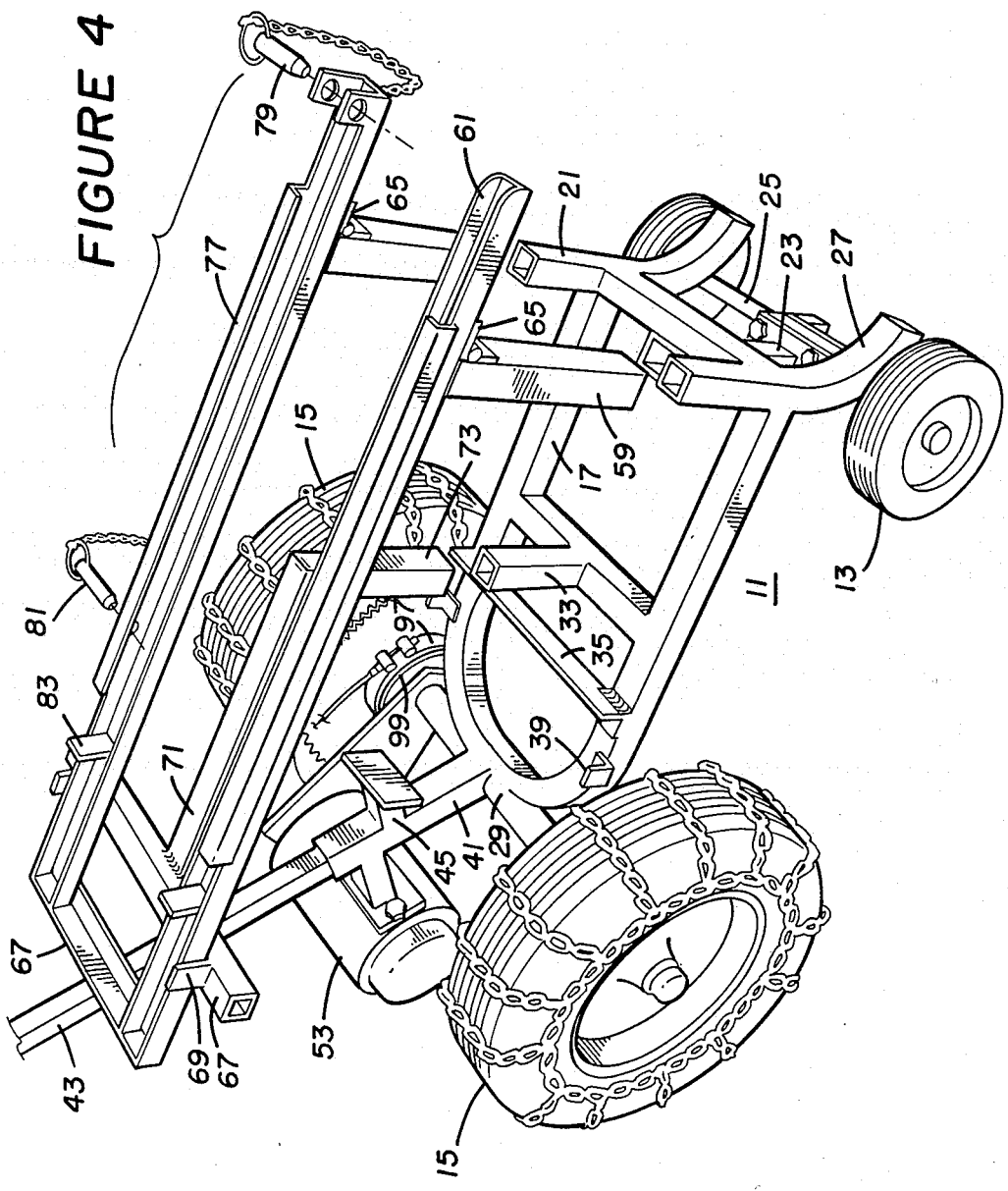
FIG. 4 is a perspective view of the powered load carrier of the present invention with the detachable load carrying apparatus and the battery removed.

Reference is made to FIGS. 1, 2, and 4 for an understanding of the basic elements of the powered load carrier of the present invention. There shown is a lower frame 11 having at least one wheel 13 mounted proximate the front end thereof and a pair of drive wheels 15 mounted proximate the rear end thereof. The basic drive arrangement for this structure is described in U.S. Pat. No. 4,289,212.

The lower frame includes a horizontal U-shaped channel section 17. The open or front end of the U-shaped member is provided with a cross bar 19 and vertical posts 21 disposed proximate the ends of the cross bar 19 where it attaches to the ends of the U-shaped channel 17. The posts 21 are comprised in the preferred embodiment of square tubing, as are both the U-shaped member and the cross bar, and project downward and curve forward. These front support posts 21 serve as the bumpers for the pushcart function of the powered load carrier when there are no accessories mounted to the front support posts which would interfere with the pushing function.

The front cross bar 19 has a further support post 23 secured to the middle thereof and depending downward therefrom. This support post is provided for mounting a single front wheel or a pair of wheels. If the terrain is rough, a large swivable inflated single front wheel on a trailing drag link can be mounted to the post 23. For inside use, or if the terrain is relatively flat, a pair of smaller fixed or castered front wheels can be mounted on a shaft 25 which is secured to the bottom of that post. Alternatively, if two front wheels are used, they or their axle shaft could also be mounted to the lower depending curved forward projecting ends 27 of the front upward projecting support posts.

As seen most clearly in FIGS. 2 and 4, an axle housing 29 is mounted to the rear of the U-shaped lower frame member 17 for supporting an axle on which the two rear drive wheels 15 are mounted. The drive wheels can be provided with chains for better traction as shown in FIG. 4. A middle cross bar 31 is provided for an intermediate support post 33 which projects upward. A further cross bar 35 made from angle iron is provided to support a battery 37 which has been deleted in FIG. 4 for clarity. A pair of upward projecting stops 39 are also welded to the U-shaped frame member 17 for preventing the battery from sliding laterally out of its position on the lower frame.

A rearmost support post 41 is secured to the center of the U-shaped lower frame member 17 and the cross axle housing 29 at their junction for the purpose of supporting a control bar 43. The support post also has a brace 45 which contacts the rear of the battery 37 to hold it in position. Standard tie downs such as are used in an automobile can be employed to hold the battery in place on the lower frame.

As shown in FIGS. 1 and 2, the control bar engages with the rear support post and is secured thereto between a pair of guide plates 47 by a locking pin 49 and is movable up and down for a variable angle. The control bar can be pinned at different angles by putting pins through the graduated holes 51 in the guide plates above and below the control bar 43. FIG. 4 shows an alternative embodiment employing a fixed angle control bar 43 which engages the rear support post 41 with a male-female relation.

A drive motor 53 is secured to the backside of the rear support post 41 and is interconnected to the rear wheels drive shaft by means of a pinion and sprocket gear 55 as best seen in FIG. 2. This or a similar arrangement is also disclosed in U.S. Pat. No. 4,289,212. The pinion gear is mounted on the drive shaft of the motor 53, and the sprocket or ring gear 55 is secured to the drive shaft of the rear wheels 15. A support plate 57 best viewed in FIG. 4 extends between one end of the housing of the motor and the axle housing 29 to help support the motor and accurately position the pinion gear with respect to the sprocket. Other drive means, such as a chain drive or fluid transmission could be utilized.

An upper frame is engaged with the lower frame by depending support posts 59 which engage with the three forward upward projecting support posts 21 and 33 on the lower frame which is best seen in FIG. 4. The upper frame includes a pair of horizontal tracks 61 for supporting the load carrying apparatus 63. The tracks extend longitudinally of the load carrier and are mounted to the tops of the depending supports 59. The front of the two horizontal tracks are mounted directly to the tops of the two depending front support posts by means of hinges 65 so that the horizontal tracks can be tipped forward about the pivot center of the hinges as shown in FIG. 2. The rear ends of the horizontal tracks are tied together by a cross brace 67.

Reference is made to FIG. 4. The rear ends of the horizontal tracks are supported by a horizontal cross bar support bracket 69 which is mounted on a horizontally extending arm 71 which is secured to the top of a depending support post 73 which engages the intermediate support post 33 on the lower frame. A pair of guides or brackets 75 are mounted on the cross bar support 69 for keeping the tracks 61 from shifting laterally under load. It is apparent that to support a larger load, a support post between the upper and lower frames could be run between the junction of the battery support bar 45 and the rear support post 41 directly to the horizontal cross bar support bracket 69.

The horizontal tracks include partial covers 77 for at least a portion of the length of the tracks which are best seen in FIGS. 4 and 5. These capture the load carrying apparatus supports in a sliding relation. The covers 77 prevent movement of the load carrying apparatus supports, at least the rear ones, from out of the tracks in an upward or forward direction when the tracks are tipped forward into an unloading position.

The horizontal tracks 61 are also provided with removable stops 79 which can be pins which project through at least one of the tracks to prevent movement of the load carrying apparatus 63 beyond certain limits.

These are also best seen in FIGS. 4 and 5. The front pin 79 prevents the load carrying apparatus from sliding out of the tracks 61 when a load is dumped. When the pin is pulled, the load carrying apparatus 63 can be removed and changed from a bucket to a flatbed or other special purpose device. The rear pin 81 is inserted when the load carrying apparatus is in the rear position with the load centered over the drive wheels 15. This prevents shifting of the load forward when the load carrier goes downhill. A pair of rear stops 83 welded in the horizontal tracks 61 prevent the load carrying apparatus from shifting too far rearward.

As seen in FIGS. 4 and 5, the load carrying apparatus is detachable for the reason that it can be slid forward and out of the horizontal tracks 61 by removing the forward retaining pin 79. Thus, either a bucket, as shown in FIGS. 1 and 2, can be utilized for fluid or particulate matter or a flatbed for building materials such as bricks, steel, pipes or lumber. The depending supports on the bottom of the load carrying apparatus are provided with rollers 85 which are enclosed in roller carriers 87 made of inverted channel members which act as fenders for the rollers. These rollers fit within the horizontal tracks, and the channels slide underneath the partial covers 77 formed on the outward edges of the tracks 61. When the load carrying apparatus is tipped forward by the upward raising of the horizontal tracks of the upper frame, the rear ends of the roller carriers for the load carrying apparatus are trapped underneath the track covers preventing the load carrying apparatus from being tipped out of the horizontal tracks.

Reference is made to FIG. 5. The carriers for the rollers are secured to a pair of cross channels 89 mounted underneath the load carrying apparatus. The load carrying apparatus includes a pair of handles 91 on the forward ends thereof whereby when a load is deposited in or on the load carrying apparatus 63, it can be pushed to a loaded position at the rear end of said tracks where the load is most closely disposed over but preferably slightly forward of the drive wheels. With the load center of gravity disposed closer to the rear wheels, it is easier for the load carrier to traverse rough ground and it makes it easier for the operator to stabilize and steer the load through the control bar.

For dumping the load, the handles 91 can be used to pull the load forward to an unloading position on the tracks at the front end of the carrier. The forward limit can be established by trial and error for each load carrying apparatus whereby the center of gravity of the loaded apparatus can be pulled to a position just past the hinged position on the tracks whereby the horizontal tracks automatically dump a load by raising up with it. By making the position of the forward limit precise, the dumping will not occur unexpectedly and can be easily controlled by the operator. A restraint (not shown) can be provided to prevent the tracks from raising beyond a predetermined dumping position; such as by putting blocks on the fronts of the two front support posts for stopping the downward motion of the horizontal tracks or providing a restraining line to the rear cross brace 67 on the horizontal tracks.

Figure 6:
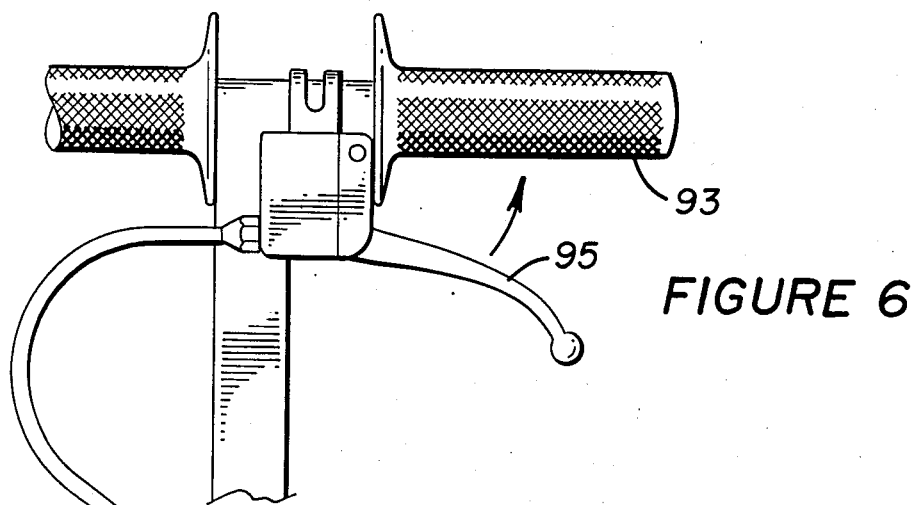
FIG. 6 is a partial top plan elevation of the control handles which are disposed on the control bar at the operator's end thereof.
Figure 7:
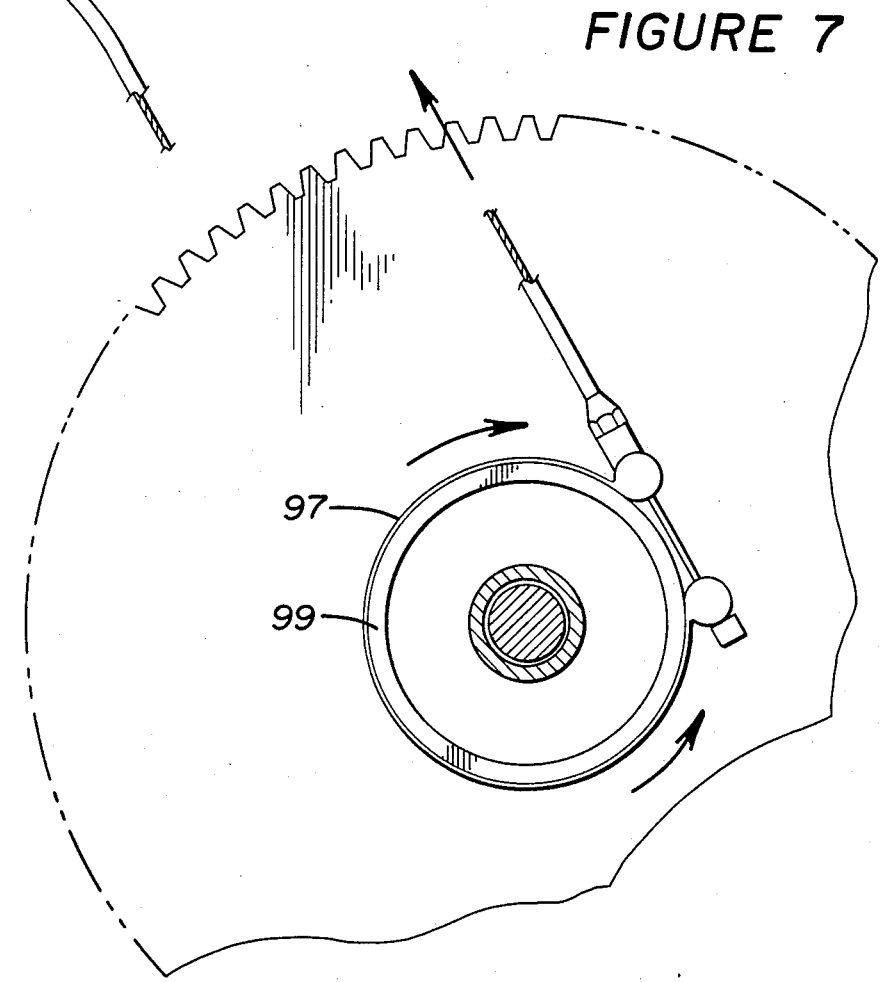
FIG. 7 is a partial side elevation in section of the band brake for locking the drive wheels.

The control bar 43 is provided with lawn mower type handles 93 which have a lockable hand brake actuator 95 as shown in FIG. 6, such as found on a bicycle, which can be actuated by squeezing. The action actuates a band brake 97 shown in FIG. 7 which surrounds a brake drum 99 mounted on the drive shaft of the drive wheels 15. The hand actuated lever 95 includes a retracted lever detent, not shown, to lock the band brake. This permits the operator to prevent undesired movement of the load carrier when he pauses on a hill or to lock the carrier from rolling when he parks it on a slope. The control bar is also provided with a button switch (not shown) which controls the power from the battery to the drive motor. It is a one speed device for simplicity and geared to move the carrier at a fast walking speed. These details are more completely described in U.S. Pat. No. 4,289,212.

It will be apparent from the foregoing description of the invention in its preferred form that it will fulfill all the objects attributable thereto, and while it has been illustrated and described in considerable detail, the protection is not to be limited to such details as have been set forth except as may be necessitated by the appended claims.

I claim:

1. A multipurpose powered load carrier or pusher comprising
    a lower frame having at least one stabilizer wheel mounted proximate the front end thereof and a pair of large drive and load carrying wheels mounted proximate the rear end thereof, said frame being adapted to engaging variable load carrying or pushing attachments,
    a control bar secured to and extending rearwardly and adjustably upwardly from the rear end of said lower frame,
    a motor mounted on said control bar including drive means engaging said motor with said drive wheels,
    an upper frame detachably engaged with said lower frame and including a pair of horizontal tracks for supporting a detachable load carrying apparatus, said horizontal tracks including partial covers for at least a portion of the length thereof, said tracks being hinged with respect to said upper frame at its forward end whereby said tracks can be tipped forward with respect to said lower frame, and
    a detachable load carrying apparatus which includes supports depending from said apparatus and being formed to engage said tracks in a manner whereby said supports are captured in a sliding relation by the covers on said tracks to prevent movement of said supports out of said tracks in an upward direction, said apparatus being movable forward or rearward on said tracks relative to said frame between a load carrying position at the rearward position on said tracks whereby the load on the load carrying apparatus is carrying apparatus is most closely disposed over said drive wheels and an unloading position on said tracks wherein the load is disposed at the forward end of said carrier proximate the pivot center of said hinge.

* * * * *